2 Sheets—Sheet 1.
R. GORDON & W. W. BAXTER.
DRIVING MECHANISM FOR SHIPS' PUMPS.
No. 189,622. Patented April 17, 1877.
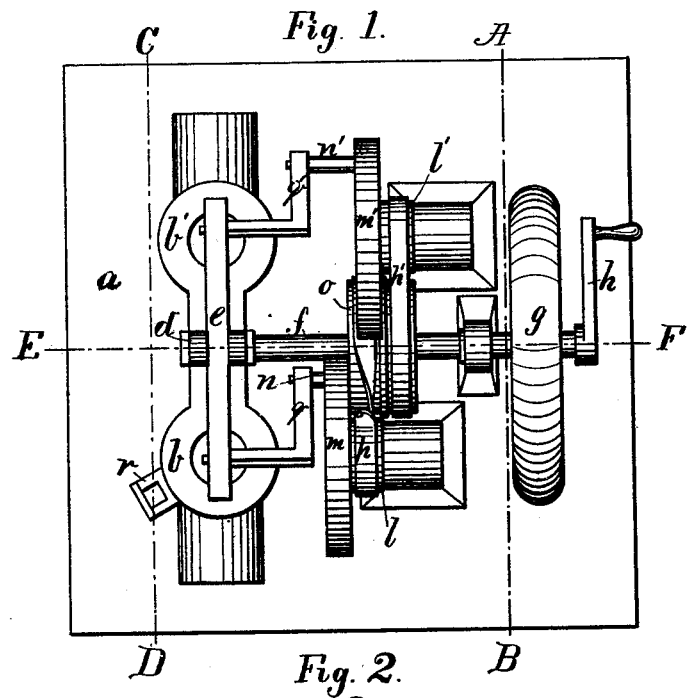
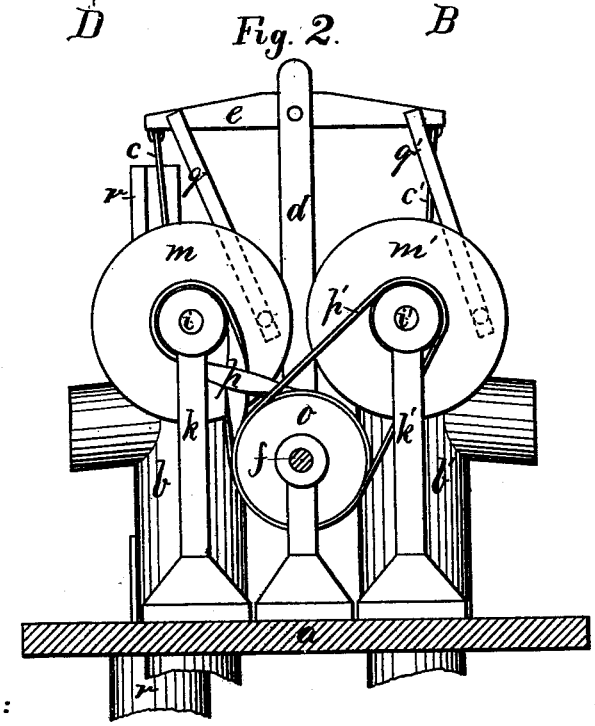
Witnesses:
Henry Chadbourn.
F. Allen.
Inventors:
Rustes Gordon and
Whitfield W. Baxter
by Allan Andrew
their atty.

2 Sheets—Sheet 2.

R. GORDON & W. W. BAXTER.
DRIVING MECHANISM FOR SHIPS' PUMPS.

No. 189,622. Patented April 17, 1877.

Witnesses:
Henry Chadbourn
F. Allen.

Inventors:
Rustes Gordon
and
Whitfield W. Baxter
by N. Van Andren
their atty.

N. PETERS, PHOTO-LITHOGRAPHER, WASHINGTON, D. C.

UNITED STATES PATENT OFFICE.

RUSTES GORDON AND WHITFIELD W. BAXTER, OF BOSTON, MASS.

IMPROVEMENT IN DRIVING MECHANISM FOR SHIPS' PUMPS.

Specification forming part of Letters Patent No. 189,622, dated April 17, 1877; application filed October 2, 1876.

*To all whom it may concern:*

Be it known that we, RUSTES GORDON, of Boston, in the county of Suffolk and State of Massachusetts, and WHITFIELD W. BAXTER, also of Boston, in the county of Suffolk and State of Massachusetts, have jointly invented certain new and useful Improvements in Driving Mechanism for Ships' Pumps; and we do hereby declare that the following is a full, clear, and exact description thereof, which will enable others skilled in the art to which it appertains to make and use the same, reference being had to the accompanying drawings, and to letters of reference marked thereon, which form a part of this specification.

Our invention relates to improvements in driving mechanism for ships' pumps, and consists of a rotary driving-shaft provided with a crank, when hand-power is used, or with a pulley, or its equivalent, when steam or other motive power is employed. In combination with the said rotary driving-shaft we employ a pair of intermediate shafts, to which the rotary motion from the driving-shaft is conducted by means of belts, cords, or gears, or their equivalents. Each of the said intermediate shafts is provided with a disk or crank having a crank-pin, to which the lower end of a connecting-rod is jointed. The upper end of each of the said connecting-rods is jointed to the walking-beam of an ordinary pair of ships' pumps, and in this manner we are able to work the pumps up and down from a driving-shaft having a continuous rotary motion.

Figure 4:
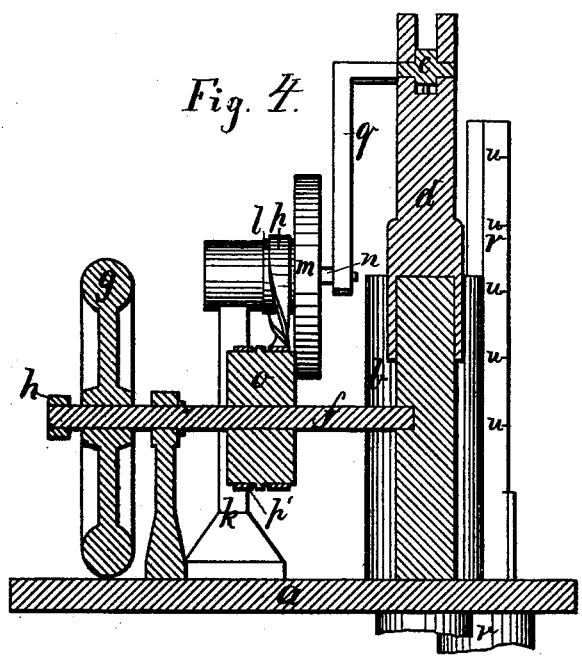
Figure 3:
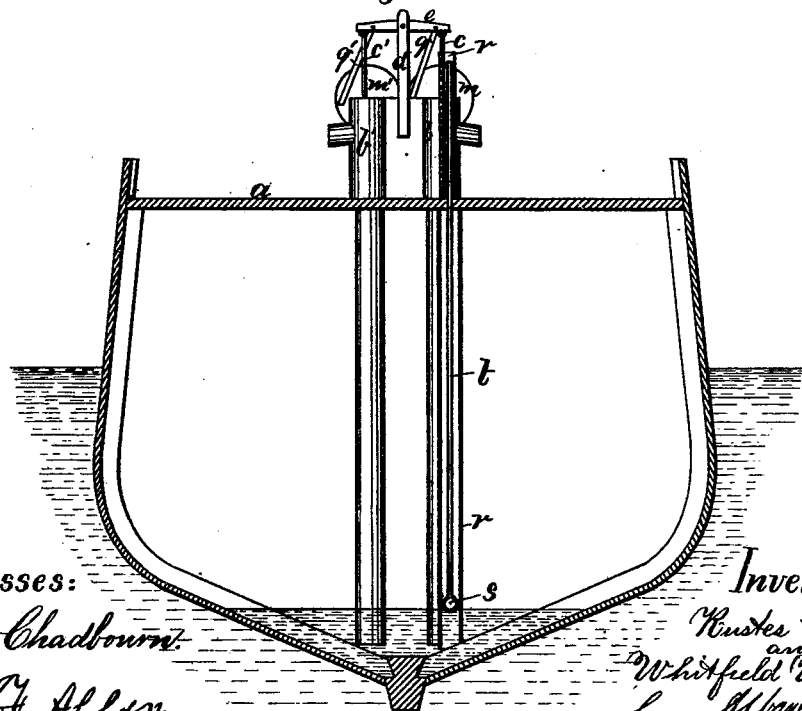

On the accompanying drawings, Figure 1 represents a ground plan of our invention. Fig. 2 represents a cross-section on line A B shown in Fig. 1. Fig. 3 represents a reduced cross-section on the line C D shown in Fig. 1, showing the pumps and indicator in connection with the hull of a vessel; and Fig. 4 represents a cross-section on the line E F shown in Fig. 1.

Similar letters refer to similar parts wherever they occur on the the different parts of the drawings.

$a$ represents the deck of a vessel, and $b$ $b'$ the pumps, with their pump-rods $c$ $c'$, standard $d$, walking-beam $e$, and pump-pistons in the usual manner. $f$ represents the rotary driving-shaft, movable in bearings and provided with a drum or balance wheel, $g$. The shaft $f$ is also provided with the crank $h$, by which the shaft may be rotated by hand-power. $i$ $i'$ represent the intermediate shafts secured to the standards $k$ $k'$.

Around the shafts $i$ $i'$ are the pulleys $l$ $l'$, made to rotate freely on each of said shafts, and are each provided with disks or cranks $m$ $m'$, having each a crank-pin, $n$ $n'$. Each disk and its pulley may, to equal advantage, be secured to each intermediate shaft, and the latter made to rotate in its standard or bearing without departing from the spirit of our invention.

The rotary power from the driving-shaft $f$ is conveyed to the pulleys $l$ $l'$ by means of the pulley $o$ on the driving-shaft, and the belts $p$ $p'$ leading therefrom to the pulleys $l$ $l'$. Gears or their equivalents may be substituted instead of the pulleys $l$ $l'$ $o$, and the belts $p$ $p'$, for the purpose of conveying the rotary motion from the shaft $f$ to the disks $m$ $m'$, without departing from our invention.

$q$ $q'$ represent the connecting-rods from the crank-pins $n$ $n'$ to the outer ends of the walking-beam $e$, as shown. It will thus be seen that, as the shaft $f$ is set in a rotary motion, the pump-rods and their pistons are operated up and down in the pump-cylinders.

In Fig. 3, $r$ represents the indicator-tube open in its upper and lower ends. S represents the hollow float of the spherical shape, and connected to a vertical hollow rod, $t$, the upper end of which indicates the rise and fall of the water in the tube $r$ on a scale, $u$ $u$ $u$, on the open upper end of the tube $r$.

It will thus be seen that the depth of water in the hold can easily be ascertained above deck simply be reading off the height of the upper end of the hollow rod $t$ on the scale $u$ $u$ $u$.

Having thus fully described the nature, construction, and operation of our invention, we wish to secure by Letters Patent and claim—

In combination, the pumps $b$ $b'$, rods $c$ $c'$, standard $d$, and its walking-beam $e$, with the connecting-rods $q\ q'$, cranks $m\ m'$, pulleys $l\ l'$ $o$ or their equivalents, and the driving-shaft $f$, with its balance-wheel $g$, and crank $h$, as and for the purpose set forth and described.

In testimony that we claim the foregoing as our own and joint invention, we have affixed our signatures in presence of two witnesses.

RUSTES GORDON.
   WHITFIELD W. BAXTER.

Witnesses:
 ALBAN ANDRÉN,
 HENRY CHADBOURN.